(12) United States Patent
Kagami et al.

(10) Patent No.: US 9,012,100 B2
(45) Date of Patent: Apr. 21, 2015

(54) FUEL CELL SYSTEM

(75) Inventors: Fumio Kagami, Yokohama (JP);
Takahiro Fujii, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 99 days.

(21) Appl. No.: 13/818,248

(22) PCT Filed: Aug. 30, 2011

(86) PCT No.: PCT/JP2011/069657
§ 371 (c)(1),
(2), (4) Date: Feb. 21, 2013

(87) PCT Pub. No.: WO2012/035974
PCT Pub. Date: Mar. 22, 2012

(65) Prior Publication Data
US 2013/0157158 A1    Jun. 20, 2013

(30) Foreign Application Priority Data
Sep. 17, 2010  (JP) .................. 2010-209062

(51) Int. Cl.
*H01M 8/06* (2006.01)
*H01M 8/04* (2006.01)
*H01M 8/10* (2006.01)

(52) U.S. Cl.
CPC ...... *H01M 8/04089* (2013.01); *H01M 8/04358* (2013.01); *H01M 8/04395* (2013.01); *H01M 8/04507* (2013.01); *H01M 8/04649* (2013.01); *H01M 8/04723* (2013.01); *H01M 8/04753* (2013.01); *H01M 8/04835* (2013.01); *H01M 2008/1095* (2013.01); *Y02E 60/50* (2013.01)

(58) Field of Classification Search
CPC .......... H01M 8/00; H01M 2008/1095; H01M 8/04089; H01M 8/04358; H01M 8/04395; H01M 8/04507; H01M 8/04649; H01M 8/04723; H01M 8/04753; H01M 8/04835; Y02E 60/50
USPC ........................................ 429/413, 427, 428
See application file for complete search history.

(56) References Cited

U.S. PATENT DOCUMENTS

| | | | |
|---|---|---|---|
| 5,108,849 A | 4/1992 | Watkins et al. | |
| 5,292,600 A | 3/1994 | Kaufman | |
| 7,943,264 B2 | 5/2011 | Yumita et al. | |
| 2006/0029847 A1 | 2/2006 | Yumita et al. | |
| 2010/0233560 A1* | 9/2010 | Kajiwara | 429/434 |

FOREIGN PATENT DOCUMENTS

| | | |
|---|---|---|
| JP | 2007-235324 A | 9/1995 |
| JP | 02-352827 A | 12/2002 |

(Continued)

OTHER PUBLICATIONS

Canadian Office Action, May 9, 2014, 4 pages.

*Primary Examiner* — Patrick Ryan
*Assistant Examiner* — Ben Lewis
(74) *Attorney, Agent, or Firm* — Foley & Lardner LLP

(57) ABSTRACT

Provided is a fuel cell system including: a wetness detecting section for detecting a wetness of a fuel cell stack; a target SR setting section for setting a target SR of the fuel cell stack based on the wetness; a smallest SR setting section for setting, based on a load, a smallest SR necessary to prevent flooding of the fuel cell stack; and an SR control section for performing control so that an actual SR becomes temporarily larger than the smallest SR when the target SR is smaller than the smallest SR.

16 Claims, 22 Drawing Sheets

(56) References Cited

FOREIGN PATENT DOCUMENTS

| | | |
|---|---|---|
| JP | 2004-342473 A | 12/2004 |
| JP | 2006-004819 A | 1/2006 |
| JP | 2008-010347 A | 1/2008 |
| JP | 2008-269898 A | 11/2008 |
| JP | 2009-289711 A | 12/2009 |
| JP | 2010-129480 A | 6/2010 |

* cited by examiner

FUEL CELL SYSTEM

TECHNICAL FIELD

The present disclosure relates to a fuel cell system.

BACKGROUND ART

A fuel cell stack causes a power-generation reaction when a cathode gas and an anode gas are respectively supplied to the front and the back of an electrolyte membrane. When the electrolyte membrane is in a proper wet state, the fuel cell stack efficiently causes the power-generation reaction. Depending on outside-air conditions and operating conditions, however, the electrolyte membrane is brought into an over-dry state. Therefore, in JP 2002-352827 A, the wet state is detected based on an impedance of the fuel cell stack. Then, when the over-dry state is determined, a flow rate of the cathode gas is reduced. In this manner, the electrolyte membrane is prevented from being brought into the over-dry state.

SUMMARY

The fuel cell system is provided with a humidifier for keeping the electrolyte membrane in a proper wet state. In order to simplify the system and reduce the size of the system, however, the humidifier is desired to be removed or reduced in size.

The inventors of the present invention have found that excessively generated water is not discharged when a supply amount of the cathode gas becomes small in the fuel cell system described above, which is likely to result in a flooding state. Specifically, the inventors of the present invention have found a new problem in that the reduction in flow rate of the cathode gas as described in JP 2002-352827 A in the fuel cell system described above conversely results in an over-wet state (flooding state).

The present invention has been made in view of the conventional problem described above. An object of the present invention is to provide a fuel cell system capable of preventing a fuel cell stack operating in a relatively drier state than a conventional operation state from being brought into a flooding state even when the fuel cell stack is operated under a low load as in the case of an idle operation.

According to an embodiment of the present invention, there is provided a fuel cell system including: a wetness detecting section for detecting a wetness of a fuel cell stack; a target SR setting section for setting a target SR of the fuel cell stack based on the wetness; a smallest SR setting section for setting, based on a load, a smallest SR necessary to prevent flooding of the fuel cell stack; and an SR control section for performing control so that an actual SR becomes temporarily larger than the smallest SR when the target SR is smaller than the smallest SR.

Embodiments and advantages of the present invention are described in detail below with the accompanying drawings

EMBODIMENTS

First Embodiment

Figure 1:
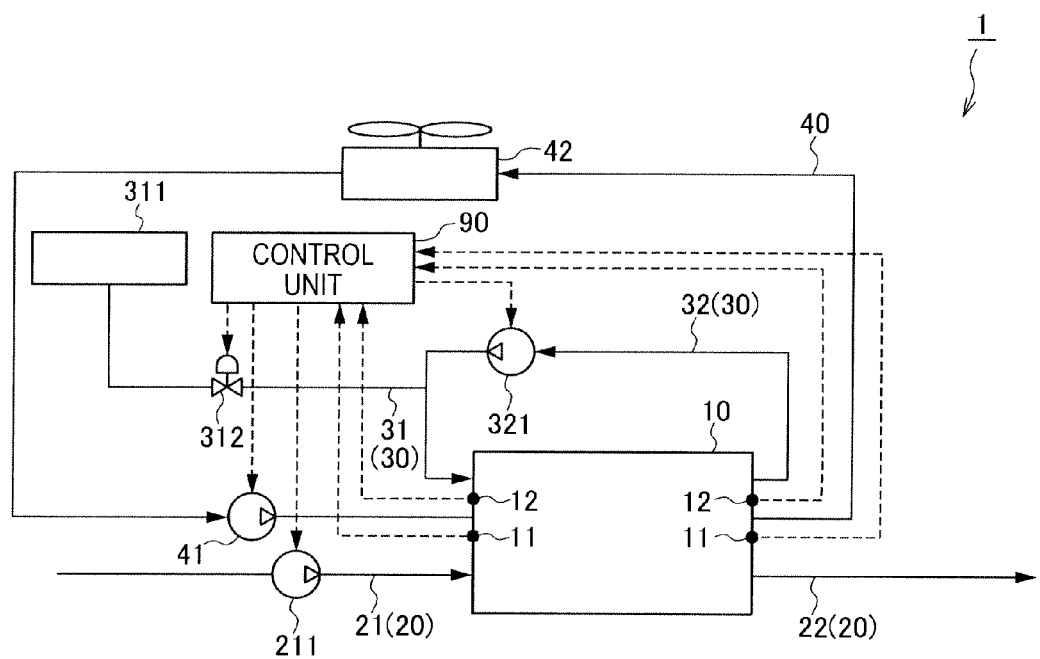
FIG. 1 is a diagram illustrating a fuel cell system according to a first embodiment of the present invention.

FIG. 1 is a diagram illustrating a fuel cell system according to a first embodiment of the present invention. First, referring to FIG. 1, an example of the fuel cell system according to the present invention is described.

A fuel cell system 1 includes a fuel cell stack 10, a cathode gas line 20, an anode gas line 30, a cooling-water circulation line 40, and a control unit 90.

The fuel cell stack 10 generates electric power when supplied with a cathode gas and an anode gas. The fuel cell stack 10 includes a load current sensor 11 and a stack impedance sensor 12. The load current sensor 11 detects a load current of the fuel cell stack 10. The stack impedance sensor 12 detects an impedance of the fuel cell stack 10.

The cathode gas line 20 includes a cathode-gas supply line 21 and a cathode-gas discharge line 22.

An air supply compressor 211 for supplying air (cathode gas) to the fuel cell stack 10 is provided to the cathode-gas supply line 21. The air, which is pressure-fed by the air supply compressor 221, flows through the cathode-gas supply line 21 to be supplied to the fuel cell stack 10.

Through the cathode-gas discharge line 22, the cathode gas discharged from the fuel cell stack 10 flows.

The anode gas line 30 includes an anode-gas supply line 31 and an anode-gas circulation line 32.

An anode tank 311 and an anode-gas pressure control valve 312 are provided to the anode-gas supply line 31. The anode tank 311 is an airtight container for containing the anode gas (hydrogen) therein. The anode-gas pressure control valve 312 adjusts a pressure of the anode gas to be supplied to the anode-gas circulation line 32 in accordance with an opening degree thereof.

An anode-gas circulation pump 321 is provided to the anode-gas circulation line 32. The anode gas discharged from the fuel cell stack 10 is supplied to the fuel cell stack 10 again by the anode-gas circulation pump 321.

The cooling-water circulation line 40 includes a cooling-water circulation pump 41 and a radiator 42. The cooling-water circulation pump 41 pressure-feeds cooling water flowing through the cooling-water circulation line 40. The radiator 42 radiates heat of the cooling water discharged from the fuel cell stack 10 to prevent the cooling-water from being overheated. The cooling water, from which heat is radiated (which is cooled), is sent to the fuel cell stack 10 again by the cooling-water circulation pump 41.

The control unit 90 receives signals from the load current sensor 11 and the stack impedance sensor 12 to control operations of the air supply compressor 211, the anode-gas pressure control valve 312, the anode-gas circulation pump 321, and the cooling-water circulation pump 41. The specific contents thereof are described below.

Figure 2A:
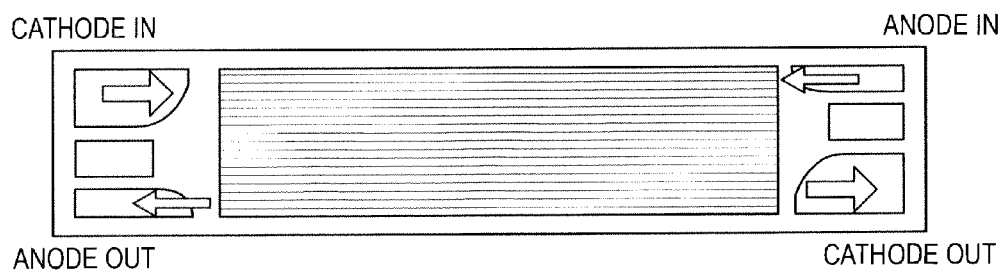
FIG. 2A is a schematic diagram for illustrating reactions in an electrolyte membrane included in a fuel cell stack.
Figure 2B:
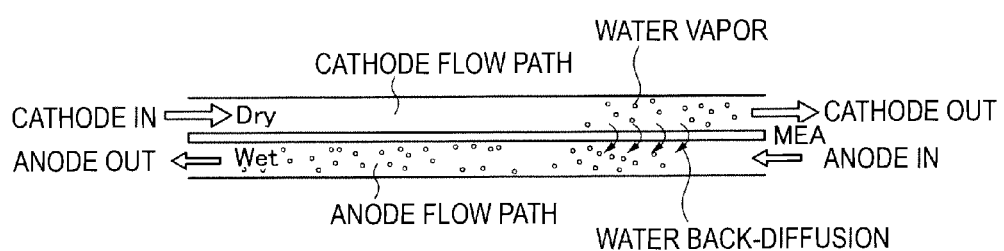
FIG. 2B is a schematic diagram for illustrating the reactions in the electrolyte membrane included in the fuel cell stack.

FIGS. 2A and 2B are schematic diagrams illustrating reactions in an electrolyte membrane included in the fuel cell stack.

As described above, the fuel cell stack 10 generates electric power when supplied with reaction gases (cathode gas $O_2$ and anode gas $H_2$). The fuel cell stack 10 is formed by laminating several hundreds of membrane electrode assemblies (MEAs), each including a cathode-electrode catalyst layer and an anode-electrode catalyst layer respectively formed on two surfaces of an electrolyte membrane. The following reactions progress respectively in the cathode-electrode catalyst layer and the anode-electrode catalyst layer in accordance with the load, and hence each membrane electrode assembly (MEA) generates electric power.

[Chemical Formulae 1]

cathode-electrode catalyst layer: $4H^+ + 4e^- + O \rightarrow 2H_2O$ (1-1)

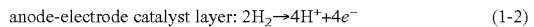

anode-electrode catalyst layer: $2H_2 \rightarrow 4H^+ + 4e^-$ (1-2)

As illustrated in FIG. 2B, as the reaction gas (cathode gas $O_2$) flows through a cathode flow path, the reaction expressed by Chemical Formula (1-1) progresses to generate water vapor. Then, a relative humidity becomes higher on the downstream side of the cathode flow path to generate a difference in humidity between the cathode side and the anode side. Then, the humidity difference back-diffuses a part of generated water to humidify the upstream side of the anode. Excessively generated water is discharged outside of the fuel cell stack 10 together with the cathode gas. The water, which humidifies the upstream side of the anode, is evaporated from the MEAs into an anode flow path to humidify the reaction gas (anode gas $H_2$) flowing through the anode flow path. Then, the water is transported to the downstream side of the anode to humidify the MEAs at the downstream of the anode (upstream of the cathode).

When the electrolyte membrane is in a proper wet state, the above-mentioned reactions occur efficiently. When the load is large, a large amount of reaction gases (cathode gas $O_2$ and anode gas $H_2$) is supplied in accordance with the load. As a result, the power-generation reaction becomes greater. A large amount of water is generated by the reaction expressed by Chemical Formula (1-1). The water humidifies the MEAs. The excessive water is discharged outside of the fuel cell stack 10 together with the cathode gas.

However, the inventors of the present invention have found that the excessively generated water is unlikely to be discharged due to a reduced flow rate of cathode gas in the fuel cell stack described in JP 2002-352827 A, and hence the fuel cell stack 10 is likely to be brought into a flooding state.

Therefore, the inventors of the present invention have conceived of a technique of forcibly discharging the generated water remaining in the fuel cell stack 10 by temporarily increasing the flow rate of the cathode gas to a flow rate which allows the flooding to be prevented. When the flow rate of the cathode gas can be temporarily increased in the above-mentioned manner, the excessively generated water is discharged without bringing about a great change in the wet state of the fuel cell stack (electrolyte membrane).

Moreover, the state, in which the flow rate of the cathode gas is to be reduced, is also brought about during a low-load operation such as an idle operation. Therefore, the present invention is used under such a situation.

In the following, the specific contents are described.

Figure 3:
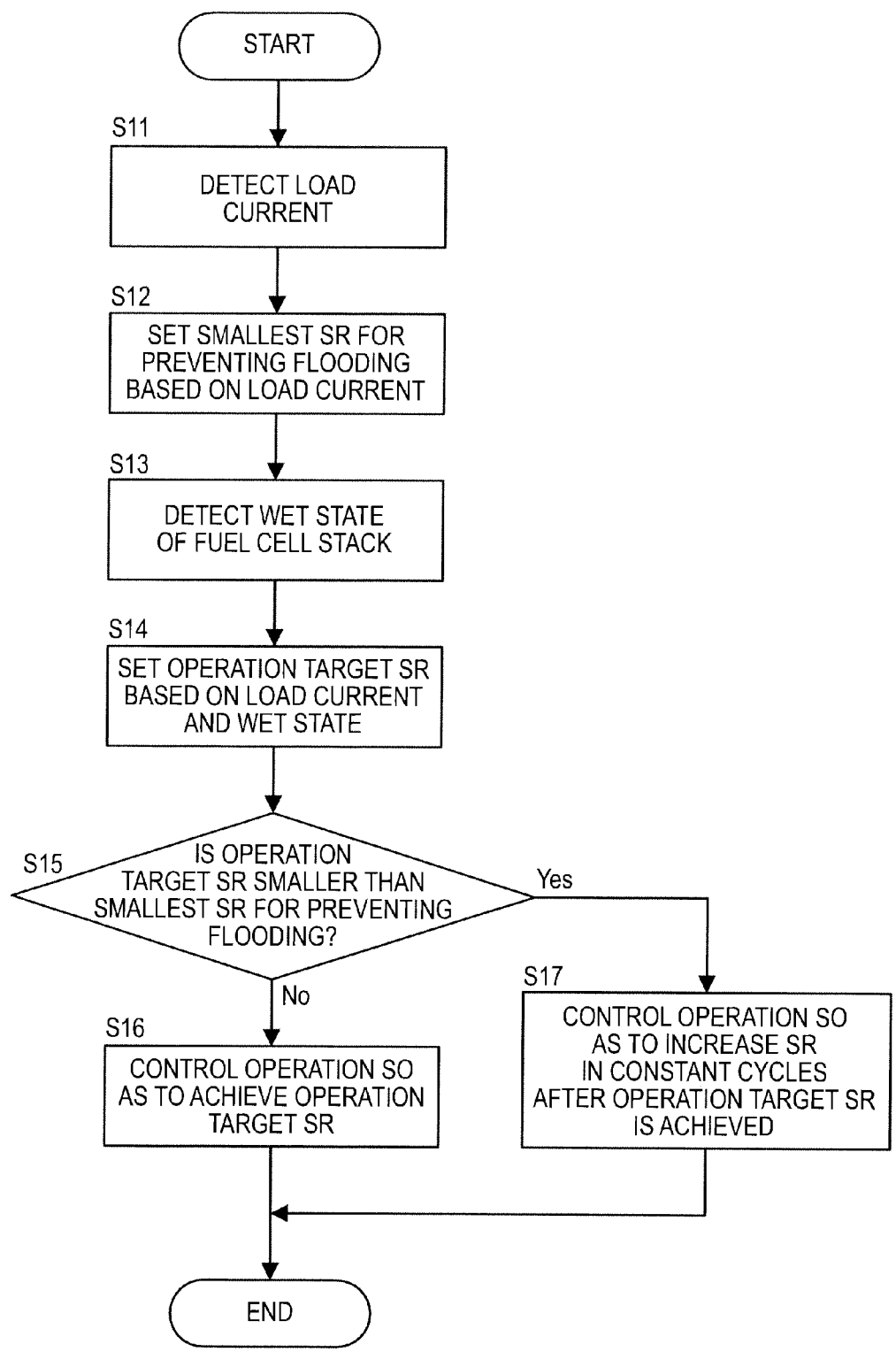
FIG. 3 is a flowchart of control executed by a controller (control unit) of the fuel cell system according to the first embodiment.

FIG. 3 is a flowchart of control executed by a controller (control unit) of the fuel cell system according to this embodiment.

In Step S11, the controller detects a load current based on the signal from the load current sensor 11.

Figure 4:
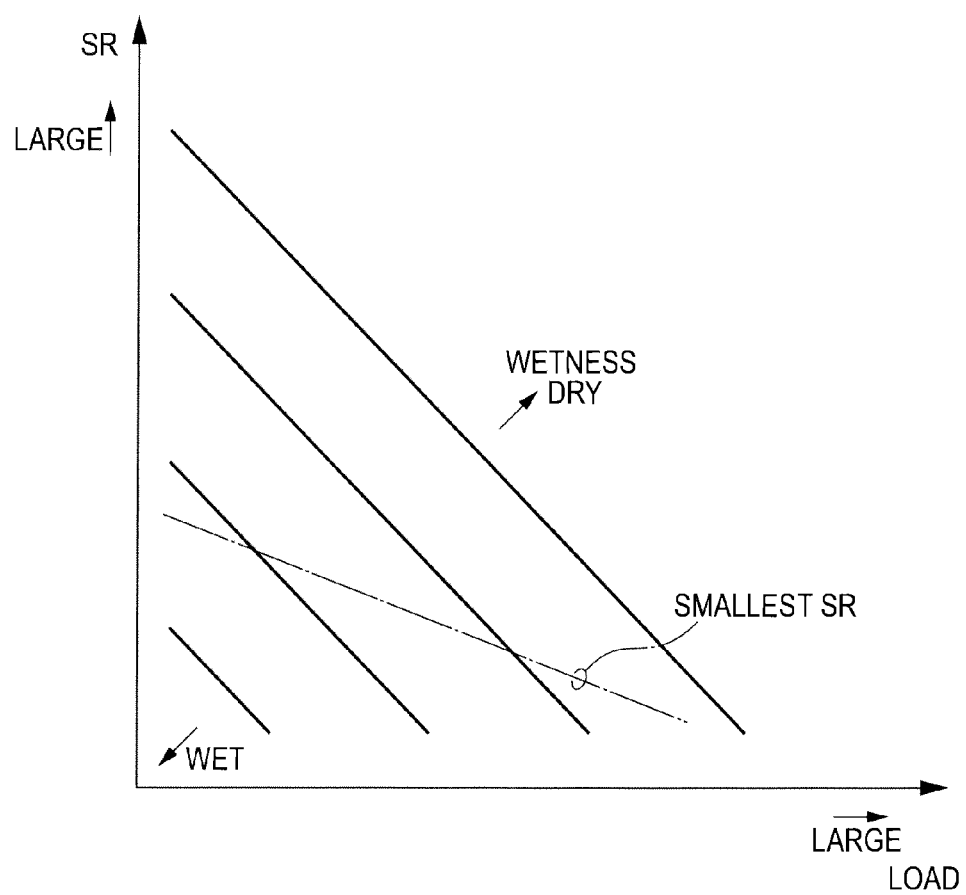
FIG. 4 is a diagram illustrating an example of a map for setting a smallest SR for preventing flooding and an operation target SR.

In Step S12, the controller sets a smallest SR for preventing flooding based on the detected load current. Specifically, the controller applies the load current to a preset map (an example thereof is illustrated in FIG. 4) to obtain the smallest SR.

The term "SR" is an abbreviation of "Stoichiometric Ratio", and indicates a ratio of a supply-gas amount to a reaction-gas amount (supply-gas amount/reaction-gas amount). Specifically, a state with SR1 means that the amount of gas as much as the reaction-gas amount is supplied, and all the supplied gas reacts. A state with SR2 means that the amount of gas twice as much as the reaction-gas amount is supplied, and a half of the supplied gas reacts, whereas the remaining half of the gas is discharged without reacting.

The load current is substantially proportional to the reaction-gas amount. Therefore, a supply-gas amount V is proportional to a value obtained by multiplying a load current I by the SR. Thus, the following expression is established.

$V = k \times I \times SR$      [Expression 1]

where

V: supply-gas amount, k: coefficient, and

I: load current

As described above, the inventors of the present invention have found that the state in which the excessively generated water is not discharged to remain in the fuel cell stack 10 (flooding state) is likely to be brought about due to a small supply amount of the cathode gas during the low-load operation such as the idle operation. Therefore, during the low-load operation, the cathode gas is supplied so that the SR becomes larger than that during a high-load operation. In this manner, the excessive gas, which is unreacted, increases, and the generated water is discharged by the excessive gas. When the load is low, the load current I is small. Therefore, even when the SR is large, the supply-gas amount itself is smaller as compared with that during the high-load operation.

In Step S13, the controller detects the wet state of the fuel cell stack 10. Specifically, the controller detects an impedance of the fuel cell stack 10 based on the signal of the stack impedance sensor 12. As the impedance becomes lower, the state is wetter, that is, a relatively wetter state. As the impedance becomes higher, the state is less wet, that is, a relatively drier state.

In Step S14, the controller sets an operation target SR based on the load current and the wet state. Specifically, the controller obtains the operation target SR by applying the load current and the wet state (impedance) to the preset map (an example thereof is illustrated in FIG. 4).

The fuel cell stack of this embodiment is operated in a less wet state as compared with a conventional state (specifically, a relatively drier state as compared with the conventional state). When the state is relatively wetter, the operation target SR which causes the electrolyte membrane to be drier is set. Specifically, under the same load, a larger SR is set so that the supply-gas amount becomes larger in the relatively wetter state as compared with that in the relatively drier state. In this manner, the excessive gas increases, and hence the generated water is likely to be discharged outside of the fuel cell stack. As a result, the electrolyte membrane is likely to be dry.

In Step S15, the controller determines whether or not the operation target SR is smaller than the smallest SR. When the operation target SR is not smaller than the smallest SR, the controller then performs processing in Step S16. When the operation target SR is smaller than the smallest SR, the controller then performs processing in Step S17.

In Step S16, the controller controls the operation so that an actual SR becomes equal to the operation target SR. Specifically, the controller controls the air supply compressor 211 to adjust the flow rate of the cathode gas (air).

In Step S17, the controller controls the operation so that the actual SR is temporarily increased in constant cycles after the actual SR becomes equal to the operation target SR. When the load is substantially constant, the SR is proportional to the flow rate of the cathode gas. Specifically, the controller controls the air supply compressor 211 to temporarily increase the flow rate of the cathode gas (air) in the constant cycles.

Figure 5A:
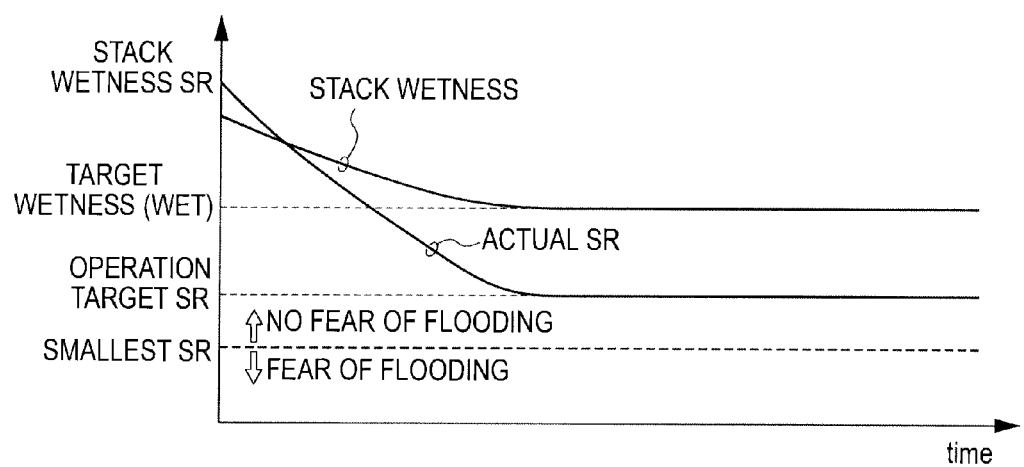
FIG. 5A is a timing chart when a control logic of this embodiment is executed in the case where a load is middle to high and a wetness indicates a relatively wetter state.
Figure 5B:
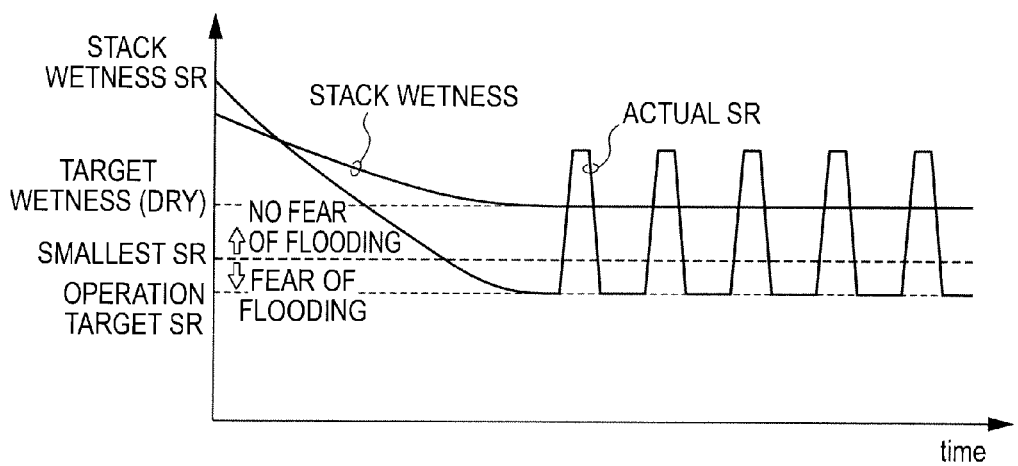
FIG. 5B is a timing chart when the control logic of this embodiment is executed in the case where the load is low and the wetness indicates a relatively drier state.

FIG. 5A is a timing chart when the control logic of this embodiment is executed when the load is middle to high and a wetness indicates the relatively wetter state. FIG. 5B is a timing chart when the control logic of this embodiment is executed when the load is low and the wetness indicates the relatively drier state. For easy understanding of the correspondence to the flowcharts, the step numbers are parenthesized.

When the load is middle to high and the wetness indicates the relatively wetter state, the load current is detected (Step S11). Based on the load current, the smallest SR is set (Step S12). The wet state (impedance) of the fuel cell stack 10 is detected (Step S13), and then the operation target SR is set based on the load current and the wet state (Step S14). At this time, when the load is middle to high and the wetness indicates the relatively wetter state, the operation target SR becomes larger than the smallest SR (No in Step S15). Therefore, the air supply compressor 211 is controlled to adjust the flow rate of the cathode gas (air) so that the operation target SR is achieved.

When the load is low and the wetness indicates the relatively drier state, the load current is detected (Step S11). Based on the load current, the smallest SR is set (Step S12). The wet state (impedance) of the fuel cell stack 10 is detected (Step S13), and then the operation target SR is set based on the load current and the wet state (Step S14). At this time, when the load is low and the wetness indicates the relatively drier state, the operation target SR becomes smaller than the smallest SR. Specifically, the flow rate of the cathode gas (air) becomes smaller because of the low load. The generated water becomes unlikely to be discharged by the effects of the reduced flow rate. Therefore, the state, in which the operation target SR becomes smaller than the smallest SR, is brought about. Therefore, when the operation target SR becomes smaller than the smallest SR (Yes in Step S15), the air supply compressor 211 is controlled so that the actual SR is temporarily increased in the constant cycles after the actual SR becomes equal to the operation target SR. As a result, the flow rate of the cathode gas (air) is temporarily increased in the constant cycles (Step S17).

As a result, the generated water remaining in the fuel cell stack 10 is forcibly discharged to prevent the flooding. The flow rate of the cathode gas (air) does not continue increasing, but temporarily increases in the constant cycles and then returns to the original state again. Therefore, the excessively generated water is discharged without bringing about a great change in the wet state of the fuel cell stack (electrolyte membrane).

Moreover, by the control on the air supply compressor 211, the flow rate of the cathode gas (air) is easily adjusted.

Further, based on the impedance and the load, the precise target SR is set.

Second Embodiment

Figure 6:
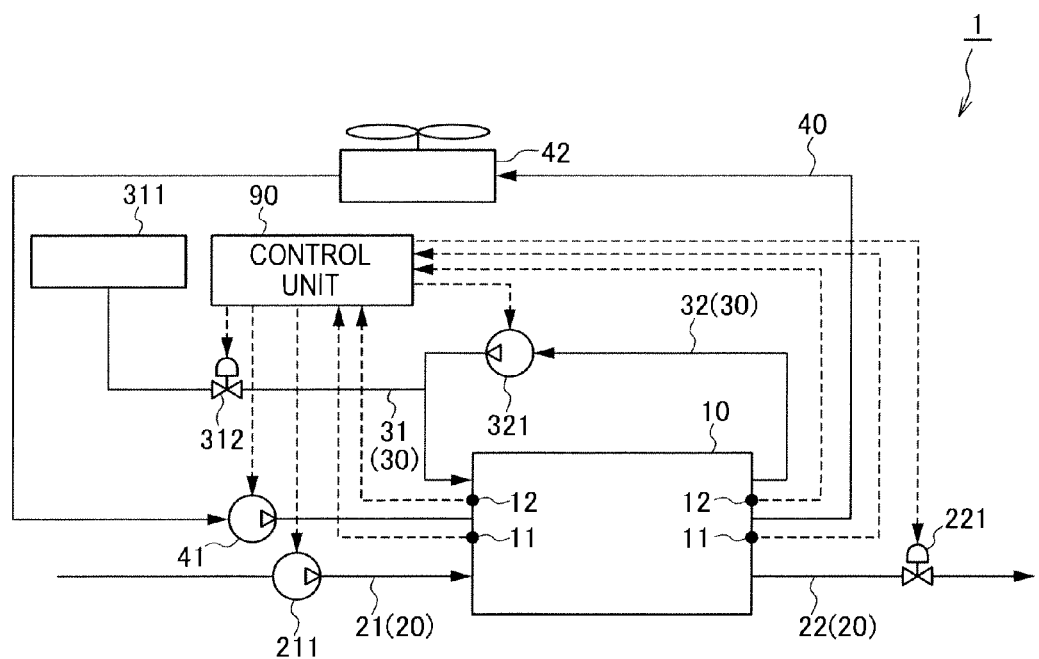
FIG. 6 is a diagram illustrating a fuel cell system according to a second embodiment of the present invention.

FIG. 6 is a diagram illustrating a fuel cell system according to a second embodiment of the present invention.

In the following description, a part having the same function as that described above is denoted by the same reference symbol, and the overlapping description is appropriately omitted.

In this embodiment, the cathode-gas pressure control valve 221 is provided to the cathode-gas discharge line 22. The cathode-gas pressure control valve 221 adjusts the pressure of the cathode gas discharged from the fuel cell stack 10.

Figure 7:
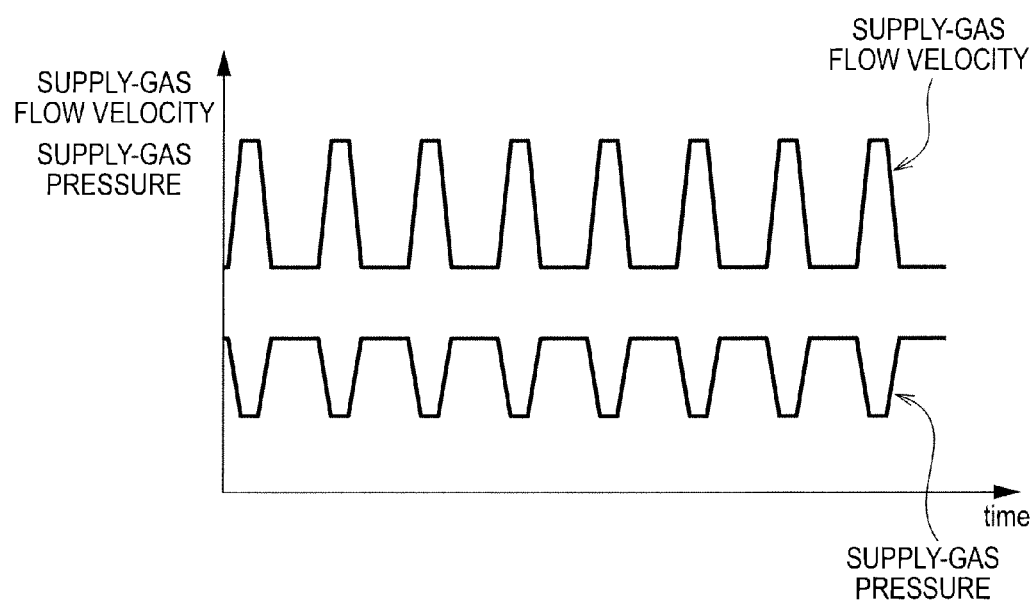
FIG. 7 is a graph showing the correlation between a pressure of a supply gas and a flow velocity of the supply gas.

FIG. 7 is a graph showing the correlation between the pressure of the supply gas and a flow velocity of the supply gas.

When the cathode-gas pressure control valve 221 is opened to lower the pressure of the gas, the flow velocity of the gas is increased. Specifically, the flow rate of the gas is increased. When the opening of the cathode-gas pressure control valve 221 is reduced to increase the pressure of the gas, the flow velocity of the gas is lowered. Specifically, the flow rate of the gas is lowered. Therefore, in the first embodiment, the air supply compressor 221 is controlled to adjust the flow rate of the cathode gas (air). However, the cathode-gas pressure control valve 221 may be controlled to adjust the flow rate of the cathode gas (air).

Even in the above-mentioned manner, the same effects as those of the first embodiment are obtained.

Third Embodiment

Figure 8:
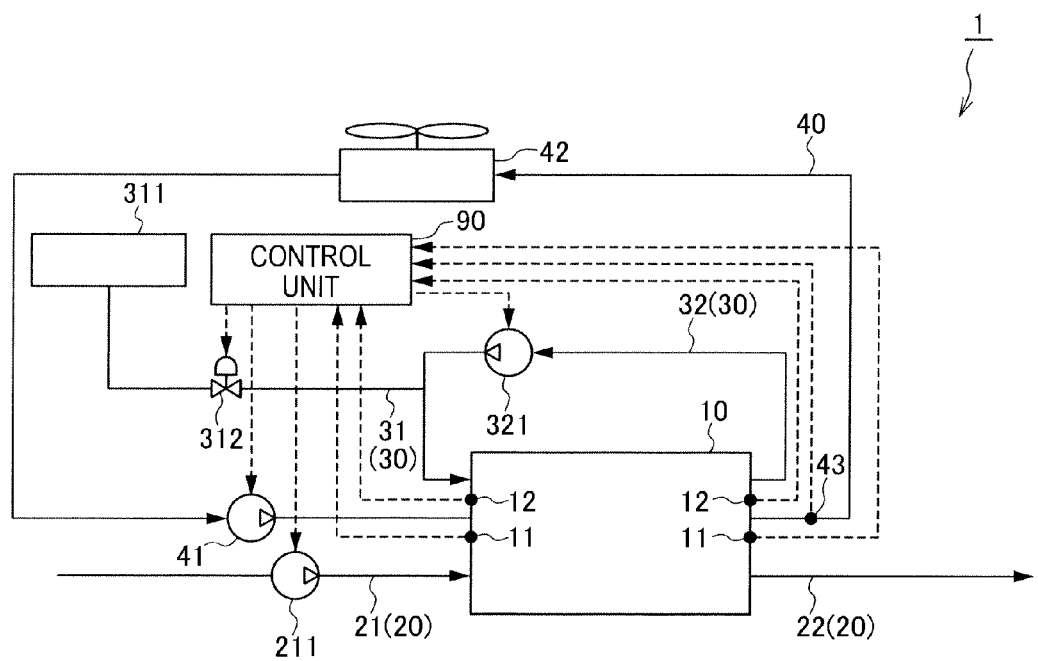
FIG. 8 is a diagram illustrating a fuel cell system according to a third embodiment of the present invention.

FIG. 8 is a diagram illustrating a fuel cell system according to a third embodiment of the present invention.

In this embodiment, a fuel cell stack cooling-water outlet temperature sensor 43 is provided to the cooling-water circulation line 40. The fuel cell stack cooling-water outlet temperature sensor 43 detects a temperature of the cooling water discharged from the fuel cell stack 10.

Here, the basic concept of this embodiment is described.

For example, when the load is abruptly reduced after travelling under a high load for a long period of time as in the case of travelling down-hill after climbing, a target temperature of the cooling water is also lowered. However, an actual temperature of the cooling water does not abruptly drop as the load does, and therefore a state at a temperature higher than the target temperature continues. In such a state, the generated water is likely to be evaporated. Therefore, when the SR is immediately changed in accordance with the load even though the load becomes small, the fuel cell stack is likely to be over-dry. Thus, in such a case, the SR is temporarily changed to an intermediate value instead of being changed at a time. Conversely, however, the flooding is likely to occur. Therefore, in such a case, the flow rate of the cathode gas (air) is increased in the constant cycles. As a result, the generated water remaining in the fuel cell stack 10 is forcibly discharged to prevent the flooding. The specific contents are described below.

Figure 9:
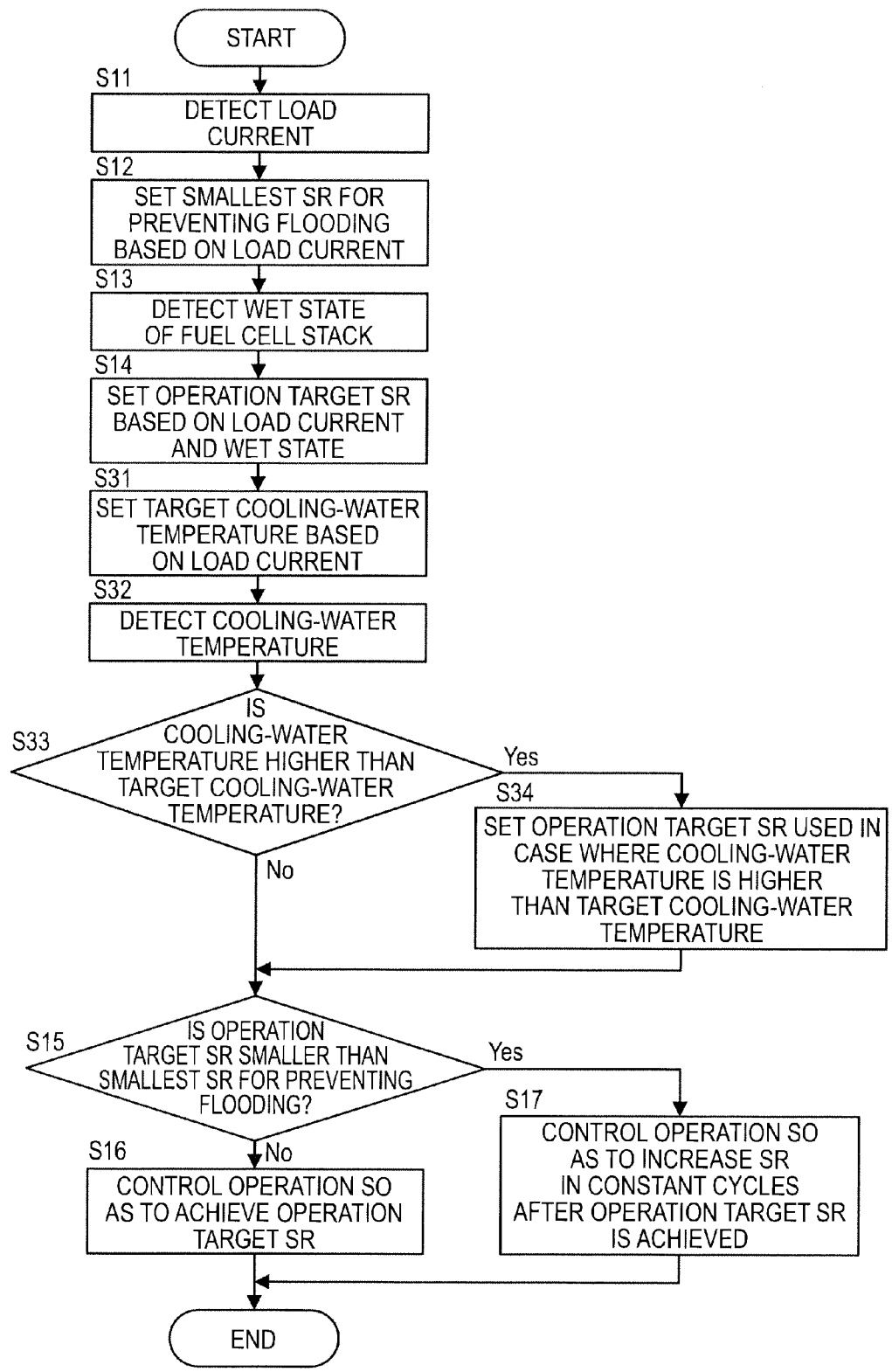
FIG. 9 is a flowchart of control executed by a controller (control unit) of the fuel cell system according to the third embodiment.

FIG. 9 is a flowchart of control executed by a controller (control unit) of the fuel cell system according to this embodiment.

Steps S11 to S14 and Steps S15 to S17 are the same as those of the first embodiment, and therefore the details thereof are herein omitted.

In Step S31, the controller sets a target cooling-water temperature based on the load current. Specifically, the controller applies the load current to a preset map to obtain the target cooling-water temperature.

In Step S32, the controller detects the cooling-water temperature based on a signal of the fuel cell stack cooling-water outlet temperature sensor 43.

In Step S33, the controller determines whether or not the detected cooling-water temperature is higher than the target cooling-water temperature. When the cooling-water temperature is not higher than the target cooling-water temperature, the controller then performs processing in Step S15. When the cooling-water temperature is higher than the target cooling-water temperature, the controller then performs processing in Step S34.

In Step S34, the controller sets the operation target SR which is used for the case where the cooling-water temperature is higher than the target cooing-water temperature.

Figure 10:
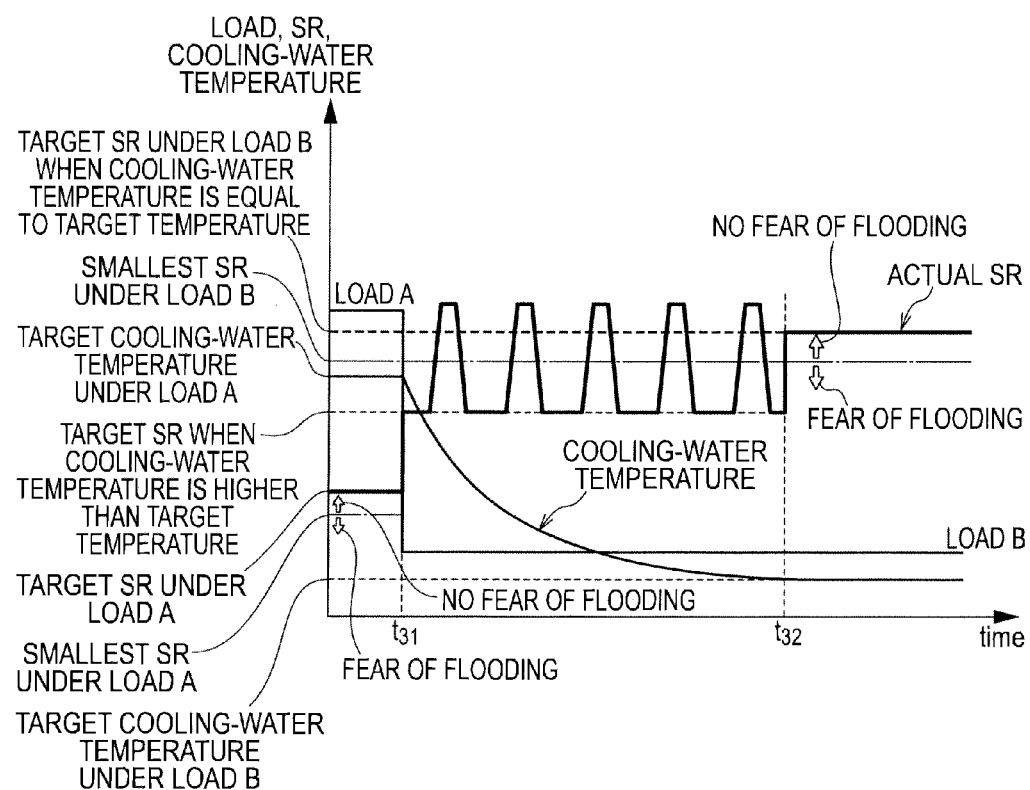
FIG. 10 is a timing chart when a control logic according to the third embodiment is executed.

FIG. 10 is a timing chart when the control logic of this embodiment is executed.

Until the time t31, the load current is A. In this case, the following operation is performed.

The load current A is detected (Step S11). Based on the load current A, the smallest SR for preventing the flooding under the load A is set (Step S12). Moreover, the wet state (impedance) of the fuel cell stack 10 is detected (Step S13). Based on the load current and the wet state, the operation target SR under the load A is set (Step S14). Further, based on the load current A, the target cooling-water temperature is set (Step S31), and the cooling-water temperature is detected (Step S32). Then, whether or not the cooling-water temperature is higher than the target cooling-water temperature is determined (Step S33). Until the time t31, the cooling-water temperature is equal to the target cooling-water temperature. Therefore, the processing proceeds to Step S15. The operation target SR under the load A is larger than the smallest SR under the load A (No in Step S15), and therefore the operation is controlled so as to achieve the operation target SR.

After the time t31, the load current is decreased to B. In this case, the following operation is performed.

The load current B is detected (Step S11). Based on the load current B, the smallest SR for preventing the flooding under the load B is set (Step S12). Moreover, the wet state (impedance) of the fuel cell stack 10 is detected (Step S13). Based on the load current and the wet state, the operation target SR under the load B is set (Step S14). Further, based on the load current B, the target cooling-water temperature is set (Step S31), and the cooling-water temperature is detected (Step S32). Then, whether or not the cooling-water temperature is higher than the target cooling-water temperature is determined (Step S33). From the time t31 until the time t32, the cooling-water temperature is higher than the target cooling-water temperature. Therefore, the processing proceeds to Step S34 where the operation target SR used for the case where the cooling-water temperature is higher than the target cooling-water temperature. The operation target SR is smaller than the smallest SR under the load B (Yes in Step S15), and therefore the operation is controlled so that the actual SR increases in the constant cycles after the actual SR becomes equal to the operation target SR (Step S17). As a result, the generated water remaining in the fuel cell stack 10 is forcibly discharged to prevent the flooding.

After the time t32, the cooling-water temperature becomes equal to the target cooling-water temperature. In this case, the following operation is performed.

The load current B is detected (Step S11). Based on the load current B, the smallest SR for preventing the flooding under the load B is set (Step S12). Moreover, the wet state (impedance) of the fuel cell stack 10 is detected (Step S13). Based on the load current and the wet state, the operation target SR under the load B is set (Step S14). Further, based on the load current B, the target cooling-water temperature is set (Step S31), and the cooling-water temperature is detected (Step S32). Then, whether or not the cooling-water temperature is higher than the target cooling-water temperature is determined (Step S33). After the time t32, the cooling-water temperature is equal to the target cooling-water temperature, and therefore the processing proceeds to Step S15. The operation target SR under the load B is larger than the smallest SR under the load B (No in Step S15), and therefore the operation is controlled so as to achieve the operation target SR.

As described above, when the load is abruptly reduced after traveling under the high load for a long period of time, the target temperature of the cooling water is also lowered. However, the temperature of the cooling water does not abruptly drop as the load does. Therefore, a state at a higher temperature than the target temperature lasts for a certain period of time. In such a state, the generated water is likely to be evaporated. Therefore, when the SR is immediately changed in accordance with the load even though the load becomes smaller, the fuel cell stack is likely to be over-dry. Thus, in such a case, the SR is temporarily lowered to a value smaller than the SR in accordance with the load (intermediate value between the SR in accordance with the load A and the SR in accordance with the load B in this embodiment) instead of being changed at a time. Conversely, however, the flooding is likely to occur. Thus, in this embodiment, the flow rate of the cathode gas (air) is increased in the constant cycles in such a case. As a result, the generated water remaining in the fuel cell stack 10 is forcibly discharged to prevent the flooding.

Fourth Embodiment

Figure 11:
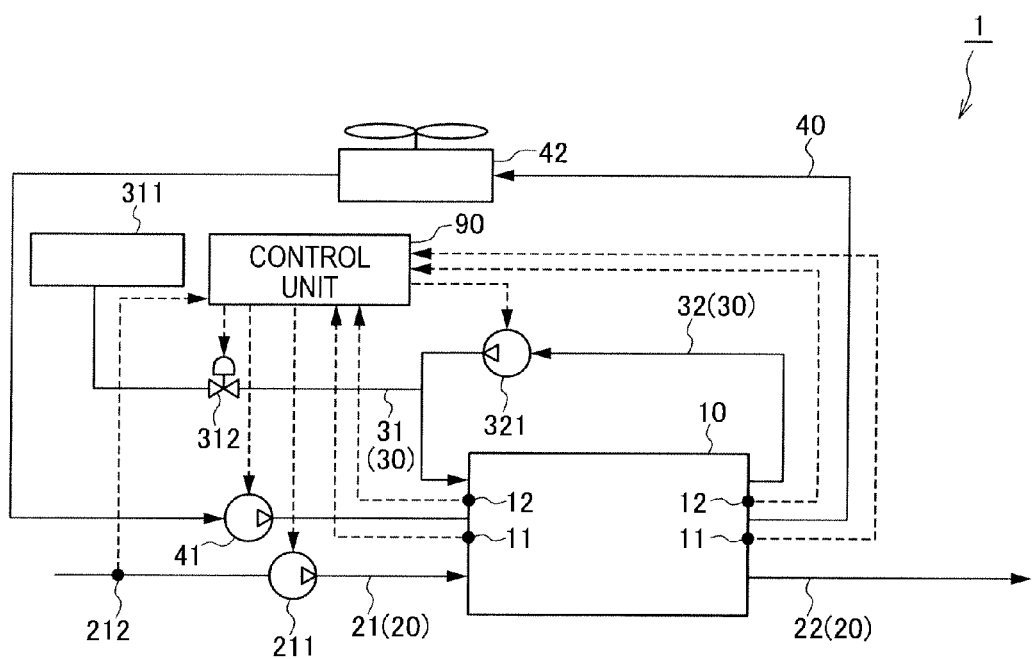
FIG. 11 is a diagram illustrating a fuel cell system according to a fourth embodiment of the present invention.

FIG. 11 is a diagram illustrating a fuel cell system according to a fourth embodiment of the present invention.

In this embodiment, an outside-air pressure sensor 212 is provided to the cathode-gas supply line 21. The outside-air pressure sensor 212 detects a pressure of outside air supplied to the fuel cell stack 10.

Here, the basic concept of this embodiment is described.

When the pressure of the outside air supplied to the fuel cell stack 10 is low (for example, traveling at a high altitude is supposed), a water content which can be carried by the cathode gas becomes larger as compared with the other cases. Therefore, when the same wetness is set as a target, the operation is performed with an SR smaller than that for the operation at the atmospheric pressure. As a result, the SR becomes small. Therefore, even when the cathode gas flows, the generated water becomes unlikely to be discharged. Then, the flooding is likely to occur. Thus, in such a case, the cathode gas (air) is increased in the constant cycles. In this manner, the generated water remaining in the fuel cell stack 10 can be forcibly discharged. As a result, the flooding can be prevented. The specific contents are described below.

Figure 12:
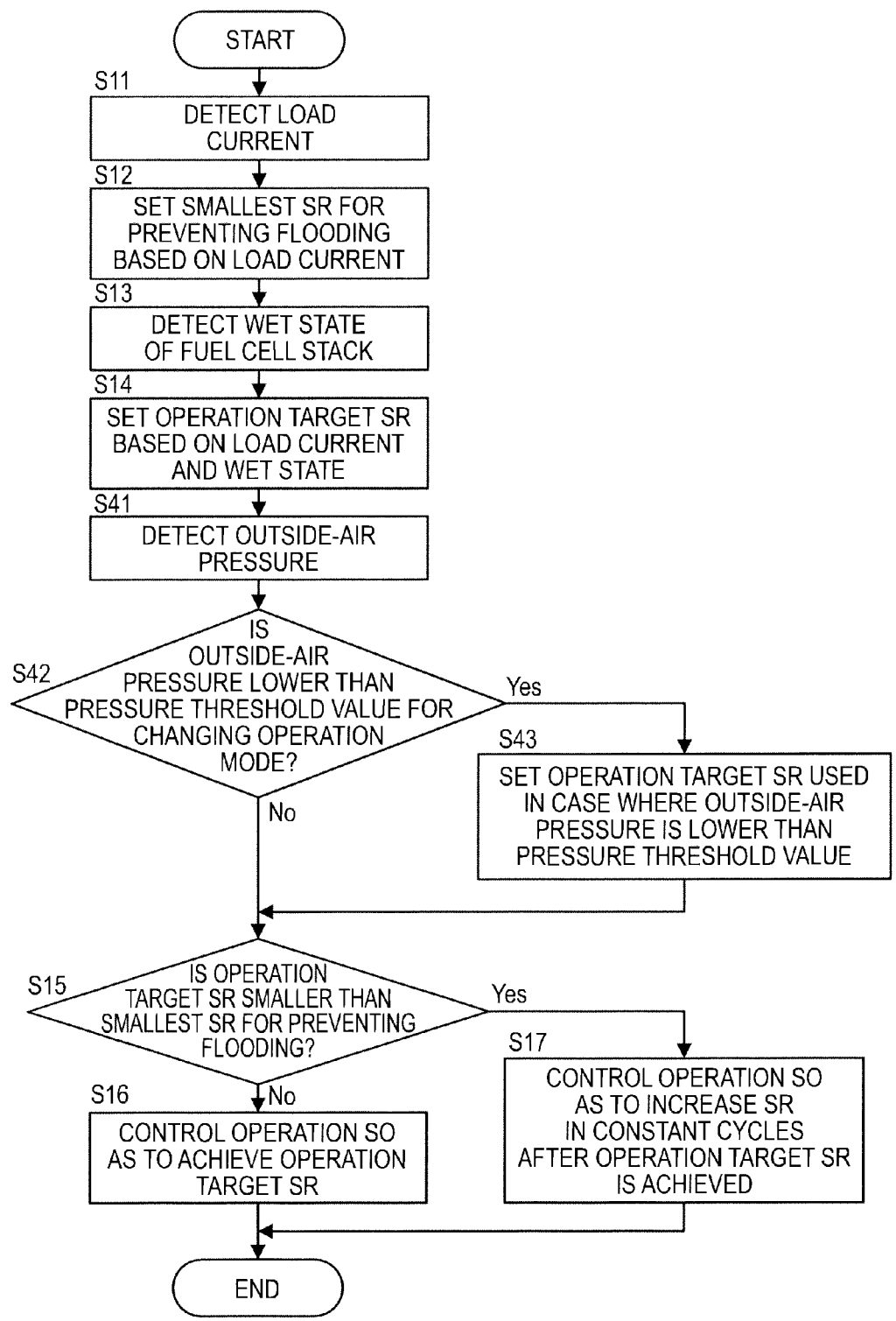
FIG. 12 is a flowchart of control executed by a controller (control unit) of the fuel cell system according to the fourth embodiment.

FIG. 12 is a flowchart of control executed by a controller (control unit) of the fuel cell system according to this embodiment.

Steps S11 to S14 and Steps S15 to S17 are the same as those of the first embodiment, and therefore the details thereof are herein omitted.

In Step S41, the controller detects the outside-air pressure based on the signal of the outside-air pressure sensor 212.

In Step S42, the controller determines whether or not the detected outside-air pressure is lower than a pressure threshold value for changing the operation mode. When the outside-air pressure is not lower than the pressure threshold value for changing the operation mode, the controller then performs processing in Step S15. When the outside-air pressure is lower than the pressure threshold value for changing the operation mode, the controller then performs processing in Step S43.

In Step S43, the controller sets the operation target SR which is used for the case where the outside-air pressure is lower than the pressure threshold value.

Figure 13:
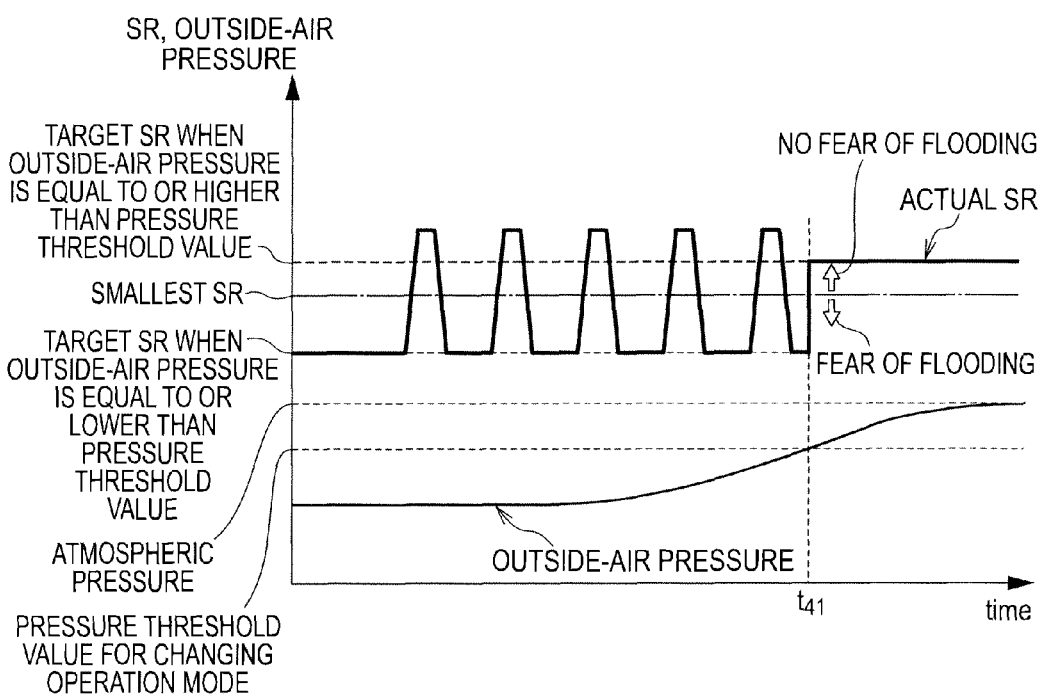
FIG. 13 is a timing chart when a control logic according to the fourth embodiment is executed.

FIG. 13 is a timing chart when the control logic of this embodiment is executed.

Until the time t41, the outside-air pressure is lower than the pressure threshold value for changing the operation mode. In this case, the following operation is performed.

The load current is detected (Step S11), and the smallest SR is set based on the load current (Step S12). Moreover, the wet state (impedance) of the fuel cell stack 10 is detected (Step S13). Based on the load current and the wet state, the operation target SR is set (Step S14). Further, the outside-air pressure is detected (step S41). Whether or not the outside-air pressure is lower than the pressure threshold value for changing the operation mode is determined (Step S42). Until the time t41, the outside-air pressure is lower than the pressure threshold value for changing the operation mode. Therefore, the operation proceeds to Step S43 where the operation target SR, which is used for the case where the outside-air pressure is lower than the pressure threshold value, is set. The operation target SR is smaller than the smallest SR (Yes in Step S15), and therefore the operation is controlled so that the actual SR increases in the constant cycles after the actual SR becomes equal to the operation target SR (Step S17). In this manner, the generated water remaining in the fuel cell stack 10 can be forcibly discharged. As a result, the flooding can be prevented.

After the time t41 at which the outside-air pressure is higher than the pressure threshold value for changing the operation mode, the following operation is performed.

The load current is detected (Step S11), and the smallest SR is set based on the load current (Step S12). Moreover, the wet state (impedance) of the fuel cell stack 10 is detected (Step S13). Based on the load current and the wet state, the operation target SR is set (Step S14). Further, the outside-air pressure is detected (step S41). Whether or not the outside-air pressure is lower than the pressure threshold value for changing the operation mode is determined (Step S42). After the time t41, the outside-air pressure is higher than the pressure threshold value for changing the operation mode. Therefore, the processing proceeds to Step S15. The operation target SR is larger than the smallest SR (No in Step S15). Therefore, the operation is controlled to achieve the operation target SR.

As described above, when the pressure of the outside air supplied to the fuel cell stack 10 is low, a water content which can be carried by the cathode gas becomes larger as compared with the other cases. Therefore, when the same wetness is set as a target, the operation is performed with the SR smaller than that for the operation at the atmospheric pressure. As a result, the SR becomes smaller. Thus, even though the cathode gas flows, the generated water is unlikely to be discharged. As a result, the flooding is likely to occur. Thus, in such a case, the cathode gas (air) is increased in the constant cycles. As a result, the generated water remaining in the fuel cell stack 10 is forcibly discharged, and the flooding is prevented.

Fifth Embodiment

Figure 14:
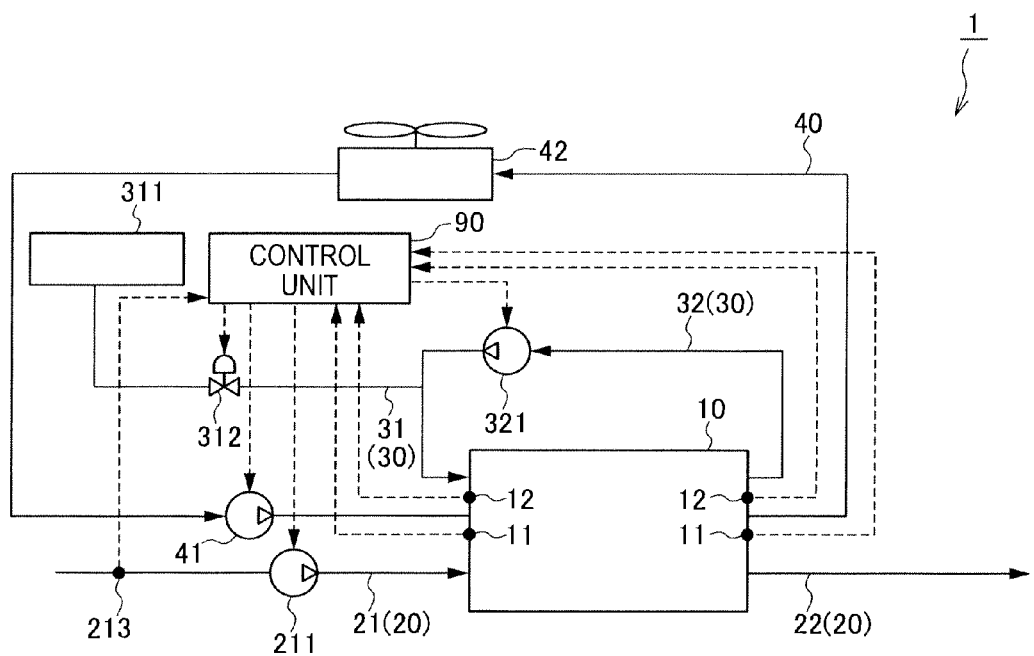
FIG. 14 is a diagram illustrating a fuel cell system according to a fifth embodiment of the present invention.

FIG. 14 is a diagram illustrating a fuel cell system according to a fifth embodiment of the present invention.

In this embodiment, an outside-air humidity sensor 213 is provided to the cathode-gas supply line 21. The outside-air humidity sensor 213 detects a humidity of the outside air supplied to the fuel cell stack 10. The outside-air pressure sensor 212 is used in the fourth embodiment, whereas the outside-air humidity sensor 213 is used in this embodiment.

Figure 15:
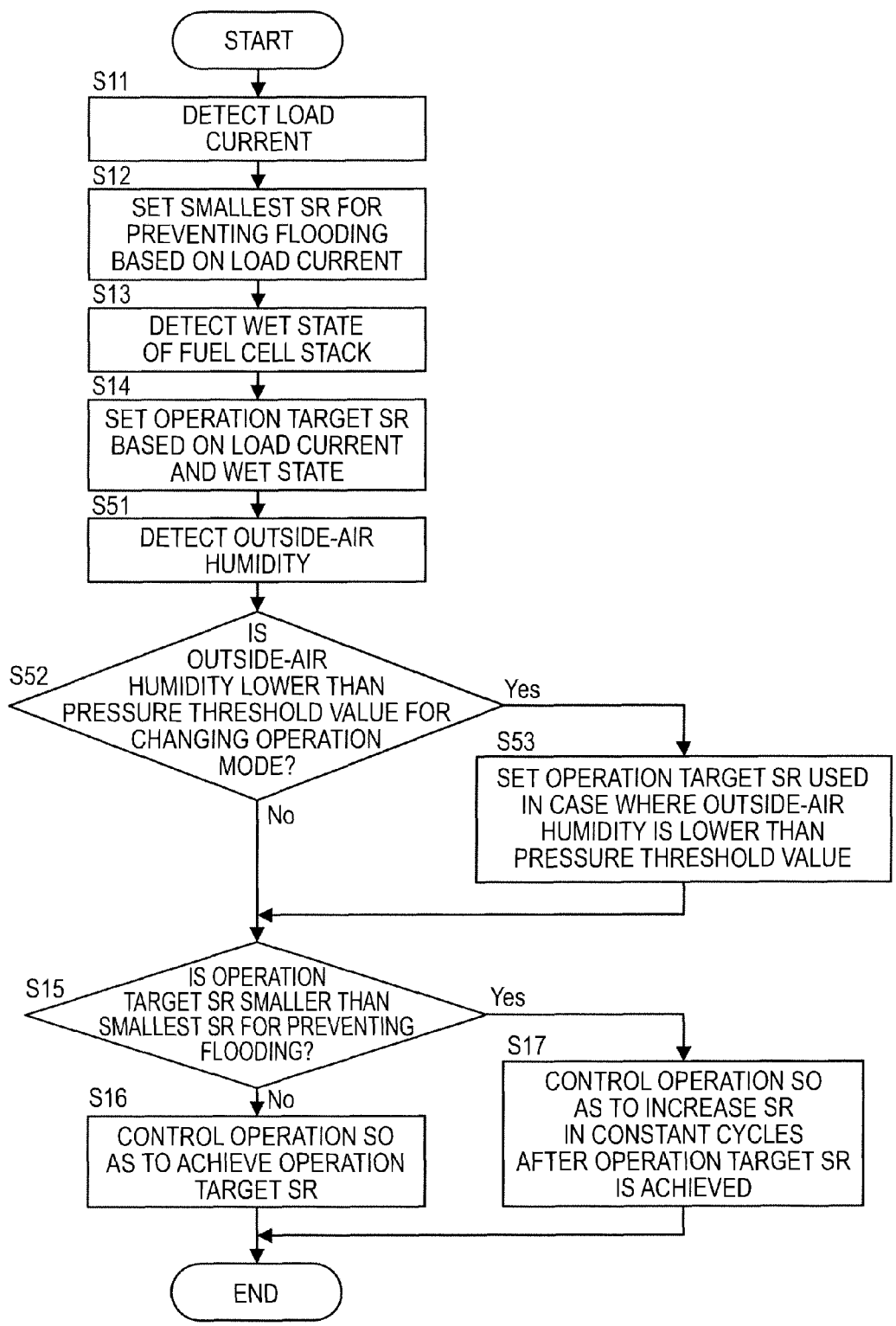
FIG. 15 is a flowchart of control executed by a controller (control unit) of the fuel cell system according to the fifth embodiment.

A control flowchart in this case is illustrated in FIG. 15. Specifically, the controller detects an outside-air humidity based on a signal from the outside-air humidity sensor 213 (Step S51) and determines whether or not the detected outside-air humidity is lower than a humidity threshold value for changing the operation mode (Step S52). When the outside-air humidity is lower than the humidity threshold value for changing the operation mode, the operation target SR, which is used for the case where the outside-air humidity is lower than the humidity threshold value, is set (Step S53).

Figure 16:
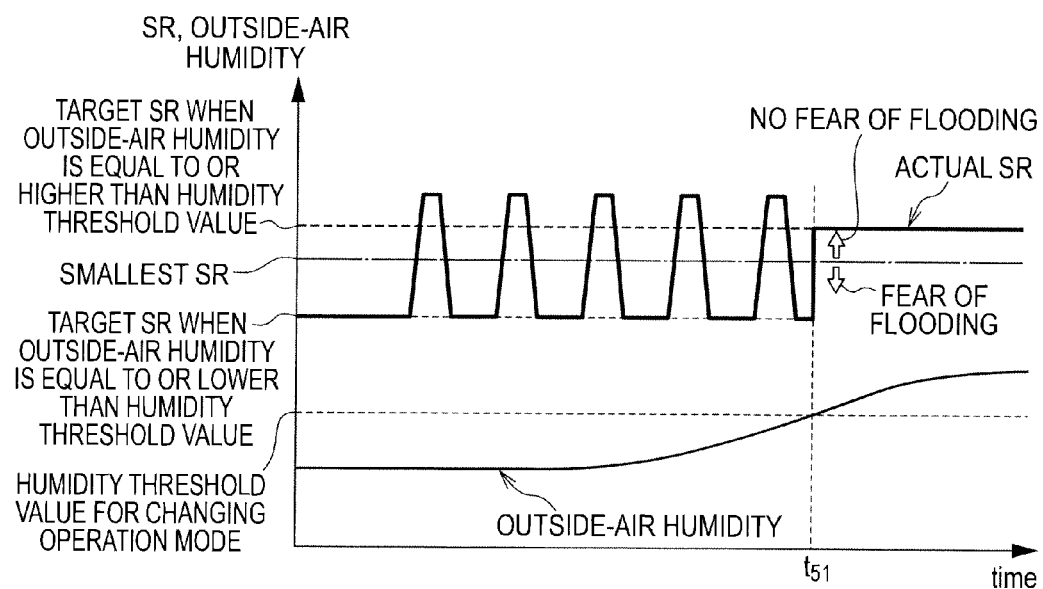
FIG. 16 is a timing chart when a control logic according to the fifth embodiment is executed.

A timing chart in this case is illustrated in FIG. 16. Specifically, until the time t51, the outside-air humidity is lower than the humidity threshold value for changing the operation mode. In this case, the actual SR is increased in the constant cycles. Even in this case, the same effects as those described above are obtained.

Sixth Embodiment

Figure 17:
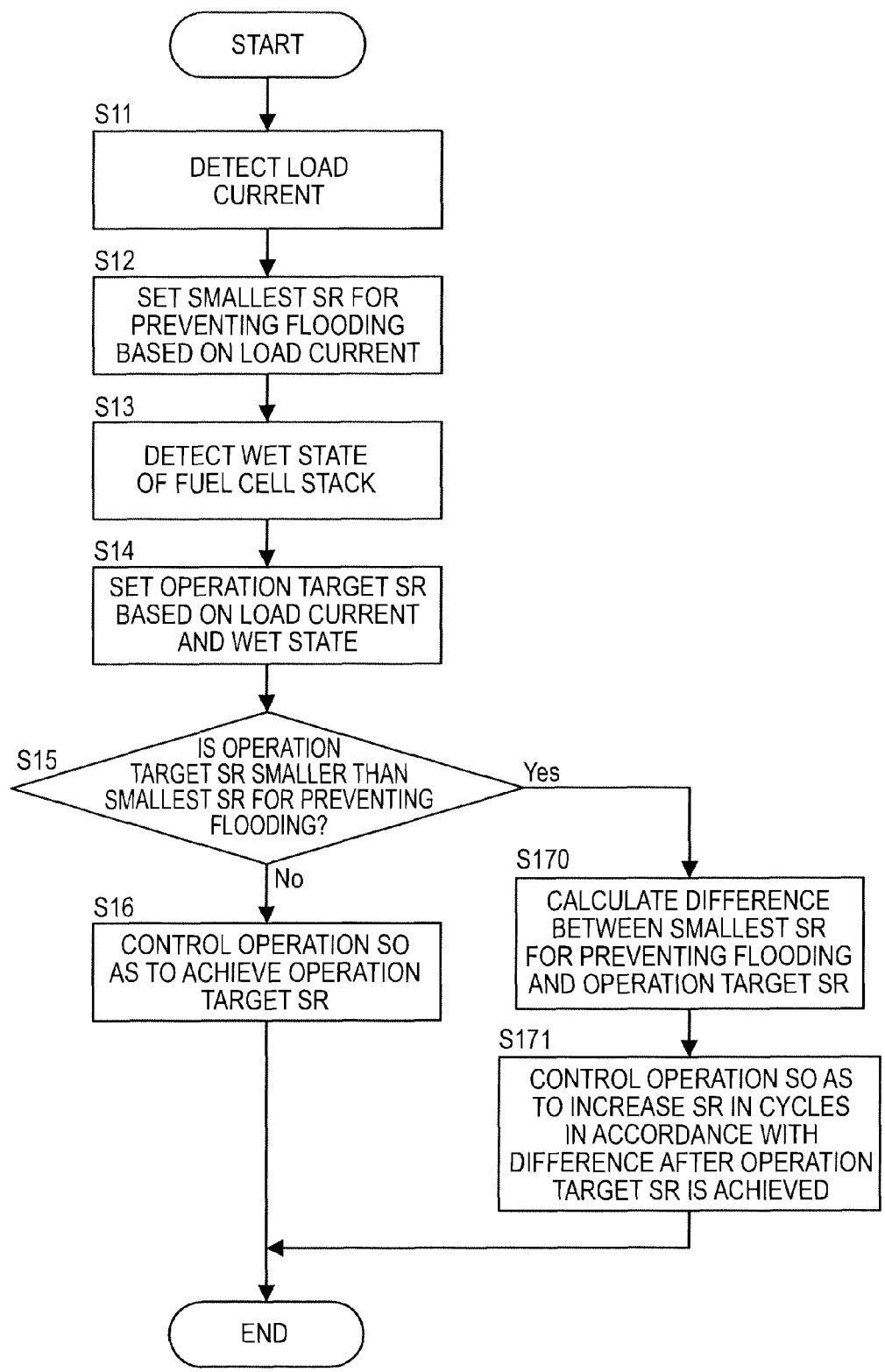
FIG. 17 is a flowchart of control executed by a controller (control unit) of a fuel cell system according to a sixth embodiment of the present invention.

FIG. 17 is a flowchart of control executed by a controller (control unit) of a fuel cell system according to a sixth embodiment of the present invention.

Steps S11 to S16 are the same as those of the first embodiment, and therefore the details thereof are herein omitted.

In Step S170, the controller obtains a difference between the smallest SR and the operation target SR.

In Step S171, the controller controls the operation in longer cycles as the difference becomes smaller.

Figure 18:
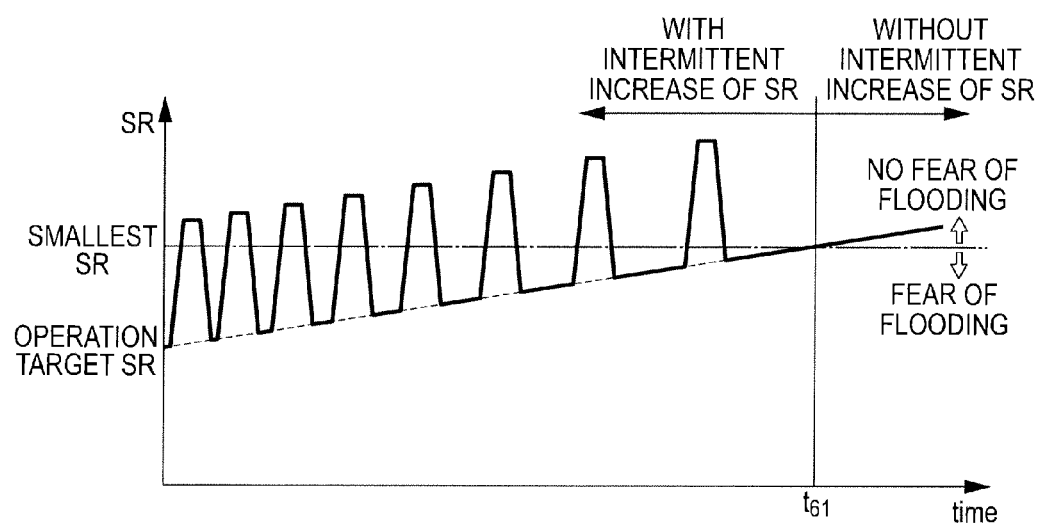
FIG. 18 is a timing chart when a control logic according to the sixth embodiment is executed.

FIG. 18 is a timing chart when the control logic of this embodiment is executed.

Until the time t61, the operation target SR is smaller than the smallest SR. In this case, as the difference between the smallest SR and the operation target SR becomes larger, the cycle becomes shorter. As the difference becomes smaller, the cycle becomes longer.

As the difference between the smallest SR and the operation target SR becomes larger, the generated water is more likely to remain. Therefore, when the cycle becomes shorter as the difference becomes larger as in the case of this embodiment, the number of times of increase/decrease increases. As a result, the generated water is reliably discharged to more effectively maintain the stable power generation. When the cycle becomes longer as the difference becomes smaller, the number of times of increase/decrease decreases. As a result, the number of times of increase/decrease is kept as small as the number of times required to discharge the generated water to minimize the energy required for the discharge. Therefore, operation efficiency is good.

Seventh Embodiment

Figure 19:
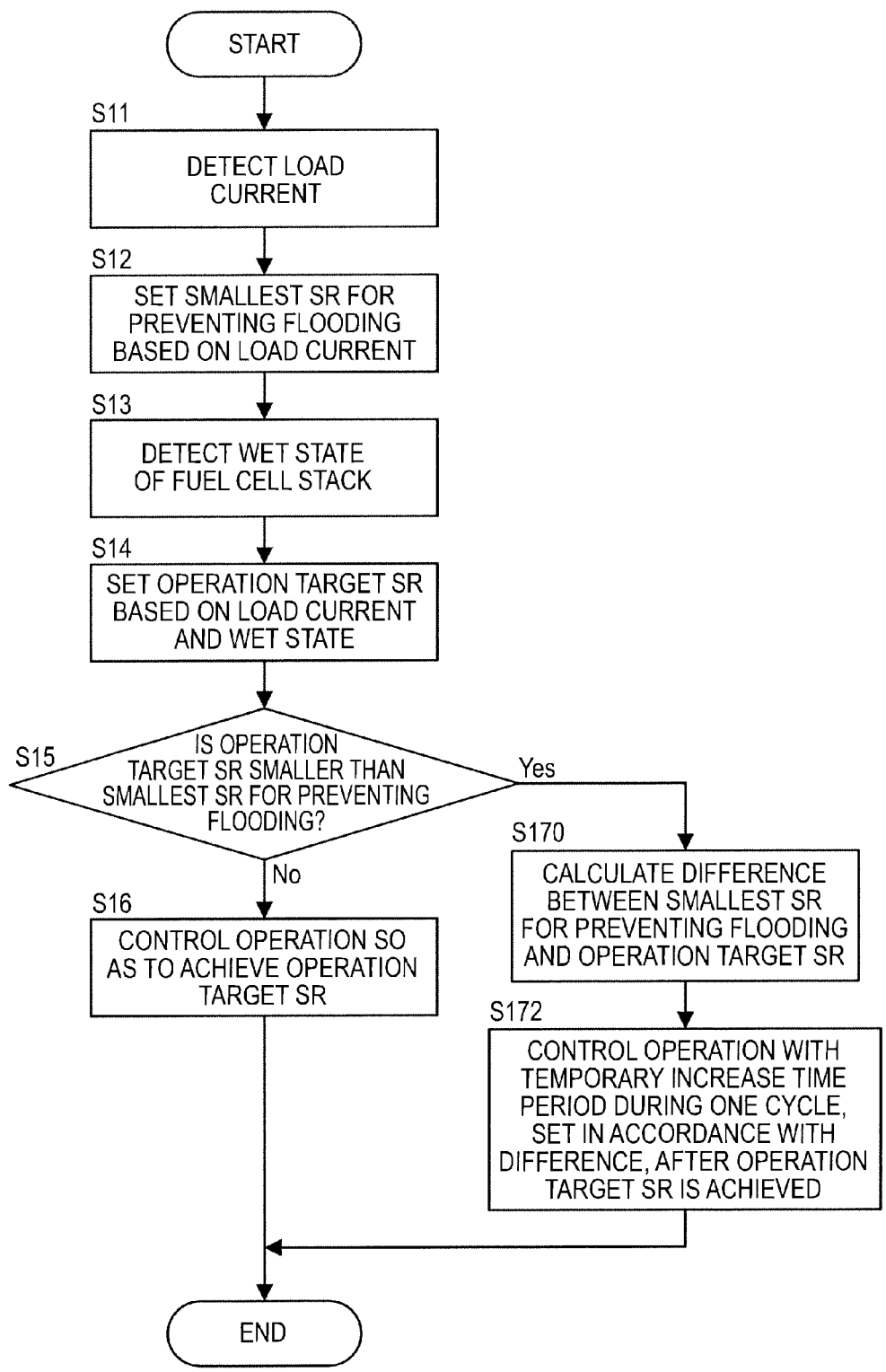
FIG. 19 is a flowchart of control executed by a controller (control unit) of a fuel cell system according to a seventh embodiment of the present invention.

FIG. 19 is a flowchart of control executed by a controller (control unit) of a fuel cell system according to a seventh embodiment of the present invention.

Steps S11 to S16 and Step S170 are the same as those of the sixth embodiment, and therefore the details thereof are herein omitted.

In Step S172, the controller shortens a time period for temporarily increasing the SR during one cycle as the difference becomes smaller.

Figure 20:
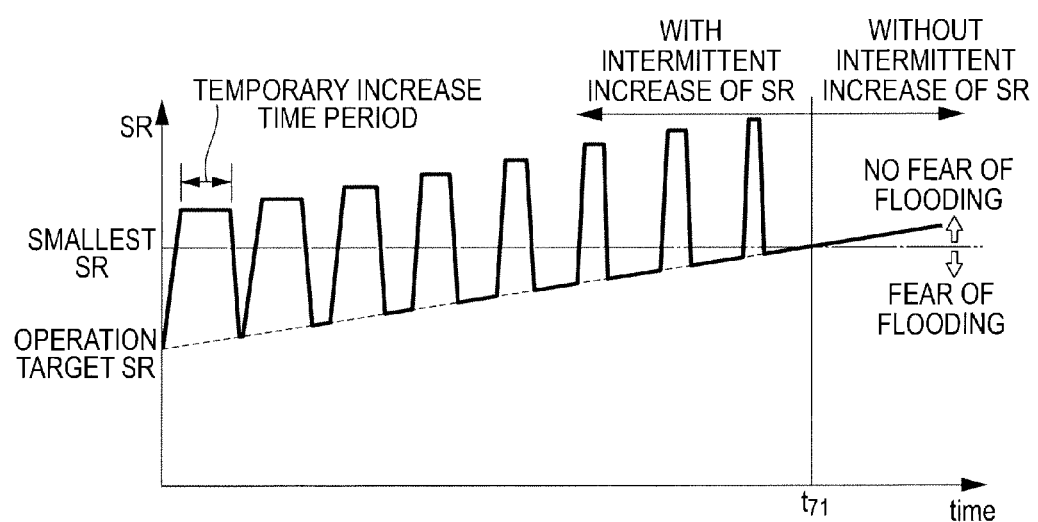
FIG. 20 is a timing chart when a control logic according to the seventh embodiment is executed.

FIG. 20 is a timing chart when the control logic of this embodiment is executed.

Until the time t71, the operation target SR is smaller than the smallest SR. At this time, as the difference between the smallest SR and the operation target SR becomes larger, the time period for temporarily increasing the SR during one cycle becomes longer. As the difference becomes smaller, the time period for temporarily increasing the SR during one cycle becomes shorter.

As the difference between the smallest SR and the operation target SR becomes larger, the generated water is more likely to remain. Therefore, when the time period for temporarily increasing the SR during one cycle becomes longer as the difference becomes larger as in the case of this embodiment, the operation time for discharging the generated water to the outside becomes longer. As a result, the generated water is reliably discharged to more effectively maintain the stable power generation. Moreover, when the difference is small, the time period for temporarily increasing the SR during one cycle is short. Therefore, the energy required for the discharge is minimized. As a result, the operation efficiency is good.

Eighth Embodiment

Figure 21:
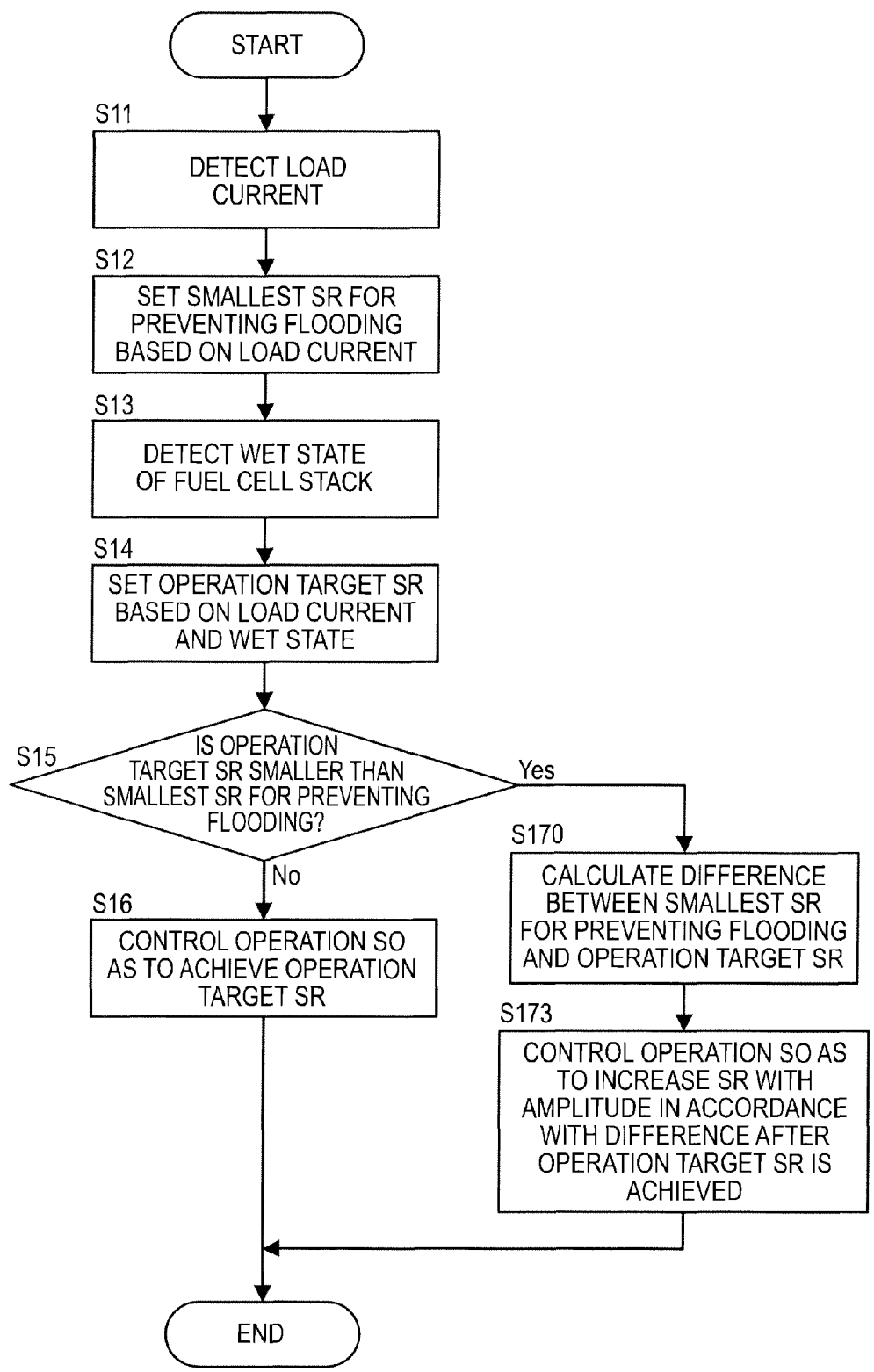
FIG. 21 is a flowchart of control executed by a controller (control unit) of a fuel cell system according to an eighth embodiment of the present invention.

FIG. 21 is a flowchart of control executed by a controller (control unit) of a fuel cell system according to an eighth embodiment of the present invention.

Steps S11 to S16 and Step S170 are the same as those of the sixth embodiment, and therefore the details thereof are herein omitted.

In Step S173, the controller controls the operation so that an increase amount (amplitude) of the SR during one cycle becomes smaller as the difference becomes smaller.

Figure 22:
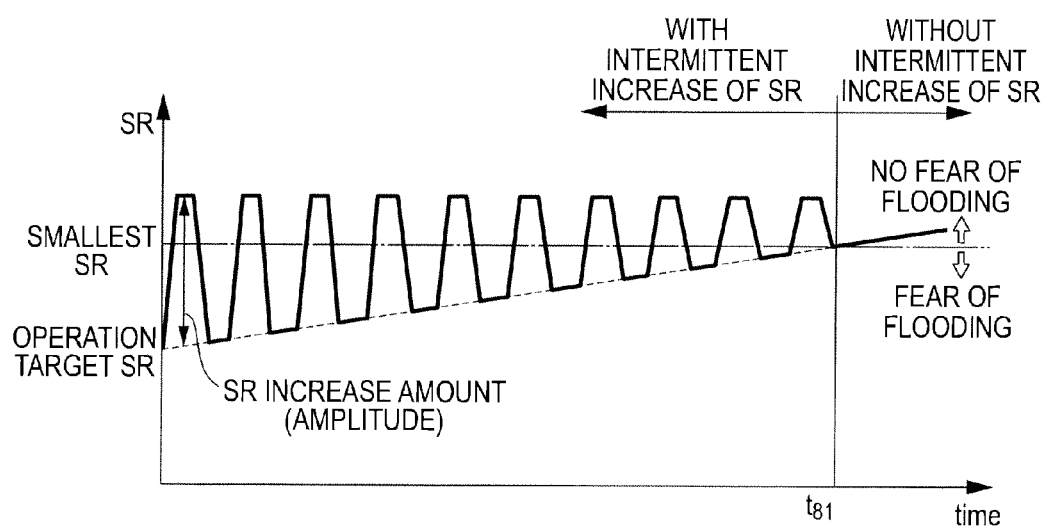
FIG. 22 is a timing chart when a control logic according to the eighth embodiment is executed.

FIG. 22 is a timing chart when the control logic of this embodiment is executed.

Until the time t81, the operation target SR is smaller than the smallest SR. At this time, as the difference between the smallest SR and the operation target SR becomes larger, the increase amount (amplitude) of the SR during one cycle becomes larger. As the difference becomes smaller, the increase amount (amplitude) of the SR during one cycle becomes smaller.

As the difference between the smallest SR and the operation target SR becomes larger, the generated water is more likely to remain. Therefore, when the increase amount (amplitude) of the SR during one cycle becomes larger as the difference becomes larger as in the case of this embodiment, a dynamic pressure for discharging the generated water to the outside becomes larger. As a result, the generated water is reliably discharged to more effectively maintain the stable power generation. When the difference is small, the increase amount (amplitude) of the SR is small during one cycle. Therefore, the energy required for the discharge is minimized. As a result, the operation efficiency is good.

The embodiments of the present invention have been described above. The embodiments described above only describe a part of examples of the application of the present invention, and do not intend to limit the technical scope of the present invention to the specific configurations of the embodiments described above.

In the embodiments described above, the wetness is detected based on the impedance. However, a voltage of each cell may be detected and the wetness is detected based on the cell voltage. The wetness may also be detected based on a total voltage of the fuel cell stack. Further, the wetness may be detected based on a gas-outlet dew point detected by a dew-point meter provided to the outlet for the cathode gas. Further, the wetness may be detected based on a liquid-water discharge rate or a liquid-water discharge amount at the gas outlet.

Further, in the embodiments described above, the case where the cathode gas flowing on one surface of the electrolyte membrane and the anode gas flowing on the opposite surface flow in the opposite directions has been described. However, the cathode gas flowing on one surface of the electrolyte membrane and the anode gas flowing on the opposite surface may flow in the same direction.

The embodiments may be combined appropriately.

The present application claims priority to Japanese Patent Application No. 2010-209062 filed in Japan Patent Office on Sep. 17, 2010. The contents of this application are incorporated herein by reference in their entirety.

The invention claimed is:

1. A fuel cell system, comprising:
   a wetness detecting section configured to detect a wetness of an electrolyte membrane of a fuel cell stack;
   a target stoichiometric ratio setting section configured to set a target stoichiometric ratio of the fuel cell stack based on the wetness so that the wetness becomes equal to a desired wetness;
   a smallest stoichiometric ratio setting section configured to set, based on a load, a smallest stoichiometric ratio necessary to prevent flooding of the fuel cell stack; and
   a stoichiometric ratio control section configured to intermittently increase and decrease an actual stoichiometric ratio when the target stoichiometric ratio is smaller than the smallest stoichiometric ratio,
   wherein the target stoichiometric ratio is set to have a value smaller than the smallest stoichiometric ratio when the load is low and the wetness indicates a relatively drier state.

2. The fuel cell system according to claim 1, wherein:
   when the actual stoichiometric ratio is to be intermittently increased and decreased, the stoichiometric ratio control section performs control so that the actual stoichiometric ratio becomes temporarily larger than the smallest stoichiometric ratio.

3. The fuel cell system according to claim 2, wherein:
the stoichiometric ratio control section is configured to control a compressor provided to a cathode-gas supply line for supplying a cathode gas to the fuel cell stack or a cathode-gas pressure control valve provided to a cathode-gas discharge line for the cathode gas discharged from the fuel cell stack.

4. The fuel cell system according to claim 1, wherein:
the wetness detecting section is configured to detect the wetness of the fuel cell stack based on an impedance of the fuel cell stack; and
the target stoichiometric ratio setting section is configured to set the target stoichiometric ratio based on the impedance and the load.

5. The fuel cell system according to claim 1, wherein:
when a cooling-water temperature is higher than a target cooling-water temperature set based on the load, the target stoichiometric ratio setting section sets the target stoichiometric ratio used for a case where the cooling-water temperature is higher than the target cooling-water temperature.

6. The fuel cell system according to claim 1, wherein:
when an outside-air pressure is lower than a pressure threshold value for changing an operation mode, the target stoichiometric ratio setting section sets the target stoichiometric ratio smaller than a target stoichiometric ratio for an operation at an atmospheric pressure.

7. The fuel cell system according to claim 1, wherein:
when an outside-air humidity is lower than a humidity threshold value for changing an operation mode, the target stoichiometric ratio setting section sets the target stoichiometric ratio smaller than a target stoichiometric ratio for an operation in a case where the outside-air humidity is higher than the humidity threshold value for changing an operation mode.

8. The fuel cell system according to claim 1, wherein:
the stoichiometric ratio control section is configured to lengthen a fluctuation cycle of the actual stoichiometric ratio as a difference between the target stoichiometric ratio and the smallest stoichiometric ratio becomes smaller.

9. The fuel cell system according to claim 1 wherein
the stoichiometric ratio control section is configured to shorten a cycle for increasing the actual stoichiometric ratio as a difference between the target stoichiometric ratio and the smallest stoichiometric ratio becomes larger, and is configured to lengthen the cycle for increasing the actual stoichiometric ratio as the difference between the target stoichiometric ratio and the smallest stoichiometric ratio becomes smaller.

10. The fuel cell system according to claim 1, wherein:
the stoichiometric ratio control section is configured to lengthen a time period for temporarily increasing the actual stoichiometric ratio during one cycle as a difference between the target stoichiometric ratio and the smallest stoichiometric ratio becomes larger, and is configured to shorten the time period for temporarily increasing the actual stoichiometric ratio during one cycle as the difference between the target stoichiometric ratio and the smallest stoichiometric ratio becomes smaller.

11. The fuel cell system according to claim 1, wherein:
the stoichiometric ratio control section is configured to increase an increase amount of the actual stoichiometric ratio during one cycle as a difference between the target stoichiometric ratio and the smallest stoichiometric ratio becomes larger, and is configured to decrease the increase amount of the actual stoichiometric ratio during one cycle as the difference between the target stoichiometric ratio and the smallest stoichiometric ratio becomes smaller.

12. The fuel cell system according to claim 1, wherein:
the target stoichiometric ratio, the smallest stoichiometric ratio and the actual stoichiometric ratio each indicate a ratio of a supply-gas amount to a reaction-gas amount.

13. The fuel cell system according to claim 1, further comprising an air supply compressor,
wherein intermittently increasing and decreasing the actual stoichiometric ratio when the target stoichiometric ratio is smaller than the smallest stoichiometric ratio comprises intermittently increasing and decreasing a flow rate of a cathode gas via the air supply compressor.

14. A fuel cell system, comprising:
a wetness detecting section configured to detect a wetness of an electrolyte membrane of a fuel cell stack;
a target stoichiometric ratio setting section configured to set a target stoichiometric ratio of the fuel cell stack based on the wetness so that the wetness becomes equal to a desired wetness;
a smallest stoichiometric ratio setting section configured to set, based on a load, a smallest stoichiometric ratio necessary to prevent flooding of the fuel cell stack; and
a stoichiometric ratio control section configured to intermittently increase and decrease an actual stoichiometric ratio when the target stoichiometric ratio is smaller than the smallest stoichiometric ratio,
wherein the target stoichiometric ratio has a characteristic in that the target stoichiometric ratio is smaller than the smallest stoichiometric ratio when the load is low and the wetness indicates a relatively drier state.

15. The fuel cell system according to claim 14, wherein:
the target stoichiometric ratio, the smallest stoichiometric ratio and the actual stoichiometric ratio each indicate a ratio of a supply-gas amount to a reaction-gas amount.

16. The fuel cell system according to claim 14, further comprising an air supply compressor,
wherein intermittently increasing and decreasing the actual stoichiometric ratio when the target stoichiometric ratio is smaller than the smallest stoichiometric ratio comprises intermittently increasing and decreasing a flow rate of a cathode gas via the air supply compressor.

* * * * *